United States Patent [19]
Perry

[11] 4,056,329
[45] Nov. 1, 1977

[54] DETECTION SYSTEM FOR MACHINE TOOLS
[75] Inventor: Louis James Perry, Oak Park, Mich.
[73] Assignee: Invo Spline, Inc., Warren, Mich.
[21] Appl. No.: 664,681
[22] Filed: Mar. 8, 1976
[51] Int. Cl.² ............................................. B23B 49/00
[52] U.S. Cl. ............................................. 408/6; 408/7
[58] Field of Search ..................... 408/6, 7; 200/61.42
[56] References Cited
U.S. PATENT DOCUMENTS 3,241,402  3/1966  Crowell et al. ........................... 408/6
3,647,998  3/1972  Rohraff, Sr. ........................... 408/6 X Primary Examiner—Othell M. Simpson
Assistant Examiner—Z. R. Bilinsky
Attorney, Agent, or Firm—Whittemore, Hulbert & Belknap

[57] ABSTRACT

A detecting device and control system for use with machine tools to detect the breakage of a tool bit, the presence or absence of a portion of a workpiece, and other improper conditions that might result in the production of imperfect work, and to prevent normal operation of the machine whenever any such conditons exist.

8 Claims, 7 Drawing Figures

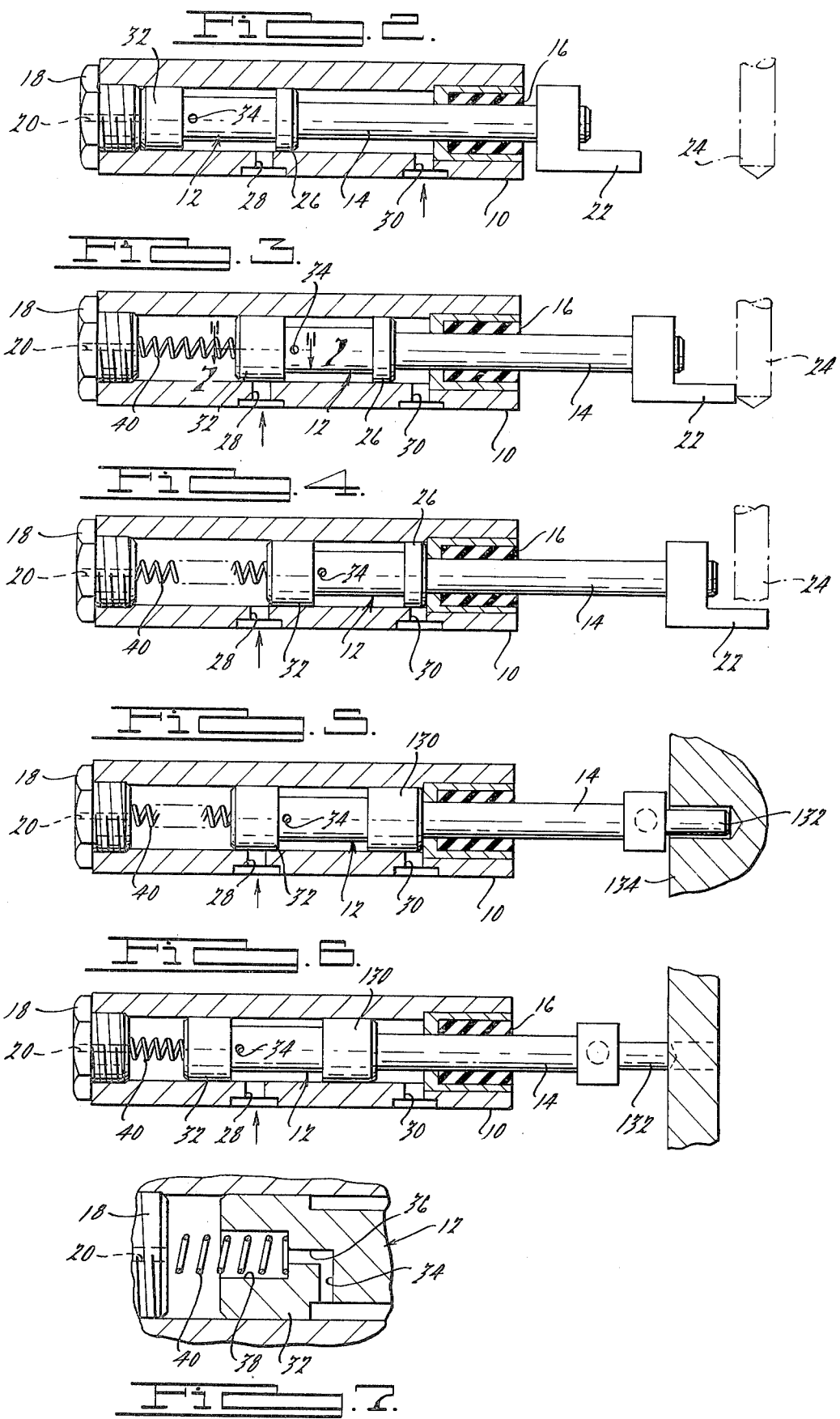

DETECTION SYSTEM FOR MACHINE TOOLS

BACKGROUND OF THE INVENTION

In U.S. Pat. No. 3,647,998 there is disclosed a device for detecting the breakage or absence of a tool bit or the like and for shutting down operation of a machine when a broken tool is detected. The present invention is an improvement upon the invention disclosed in U.S. Pat. No. 3,647,998.

While tool detection devices like those shown in U.S. Pat. No. 3,647,998 are now commercially available and have proved satisfactory in use, there are many possible operating conditions that may exist which would result in the production of imperfect work or damage to the machine or tools which can not be detected by the prior devices. Such conditions may include faulty operation of the detecting device itself, faults in the pneumatic control system, or electrical failures.

According to the present invention, the detecting device and its control system are so designed and related to the machine control circuit as to require a positive input to the machine controls before the machine can operate, and this positive signal will be produced only if there is a correct condition of the tool or workpiece being detected, and then only if the detection device itself and its control system are operating properly.

IN THE DRAWINGS

FIG. 2 is a sectional view of one form of the detecting device that is responsive to the control circuit of FIG. 1 to detect the presence or absence of a tool or the like, the detector being shown in its retracted position;

FIG. 3 is a sectional view similar to FIG. 2 showing the detector extended into contact with a machine tool to detect its presence;

FIG. 4 is a sectional view similar to FIG. 2 showing the detector in its fully extended position, detecting the absence or breakage of the machine tool;

FIG. 5 is a sectional view similar to FIG. 2 showing a different form of detector adapted to detect the presence of a hole in a workpiece;

FIG. 6 is a view similar to FIG. 5 showing the condition of the detector when it detects the absence of a hole in the workpiece; and FIG. 7 is an enlarged sectional view taken on line 7—7 of FIG. 3.

Figure 1:
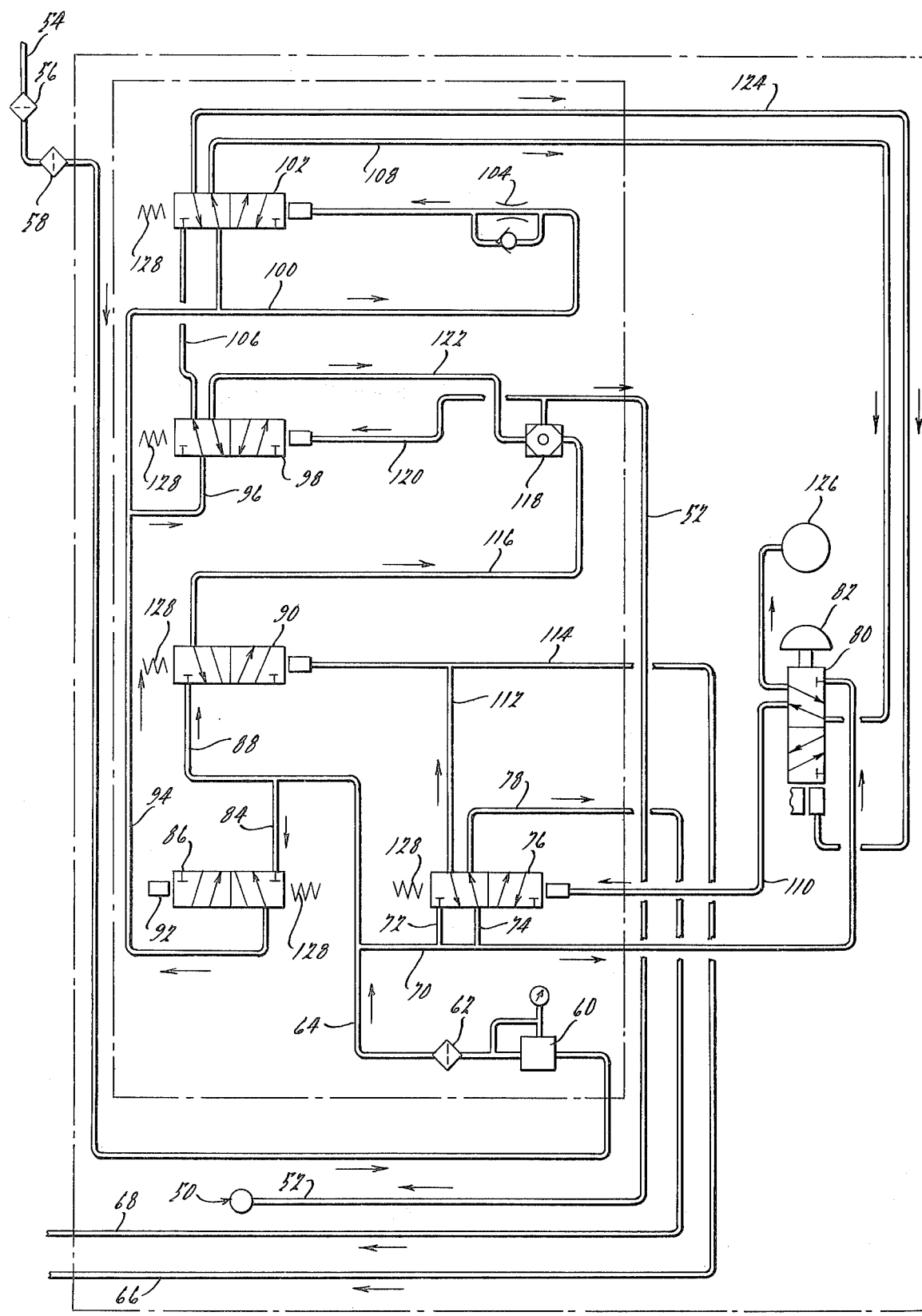
FIG. 1 is a schematic circuit drawing illustrating the control system for the detecting device.

The detecting device shown in FIG. 2 comprises a cylinder 10 having a piston 12 slidable therein and provided with an outwardly extending detector portion 14 which extends through a bushing 16 provided at one end of the cylinder 10. The other end of the cylinder 10 is closed by a threaded plug 18 having a small drilled hole 20 therein. A suitably shaped member 22 is secured on the outer end of the detector rod 14 and is adapted to be moved into and out of engagement with a tool 24 such as a drill bit, reamer, or the like.

The detector piston 12 has a forward land 26 which in the retracted position shown in FIG. 2 is located just outwardly of a port 28 in the cylinder 10, the port 28 being referred to herein as the sensing port. The cylinder is also provided with a port 30 adjacent its forward end which is sometimes referred to herein as the pressure port. At its inner end the piston 12 is provided with a land 32 which in the retracted position engages the plug 18. As shown in FIG. 7, the piston 12 has a radial opening 34 between the lands 26 and 32 which communicates with an axial passage 36 opening from a recess 38 to communicate the port 34 with the vent opening 20 in the end plug 18. A spring 40 is adapted to bias the piston 12 outwardly or toward its extended or detecting position.

It is to be understood that the detection device shown in FIG. 2 is adapted to be mounted in a suitable location on a machine in proximity to the tool 24 or other tool or part that is to be detected. The machine on which the device is used and the machine control circuitry is not necessary to an understanding of the present invention and is therefore not illustrated herein. However, it will be apparent that the device may be mounted on a machine in a manner similar to that illustrated in U.S. Pat. No. 3,647,998 or in any other appropriate manner depending upon the type of machine and the detecting function which the device is to perform.

In the control circuit illustrated in FIG. 1, the reference character 50 indicates a pressure switch which is adapted to be pressurized through a line 52 and when thus energized will initiate operation of a machine through a normal cycle of operation. The pressure switch 50 is interlocked with the control system of the present invention and cannot be energized until the detecting device has first operated properly and verified the presence of a tool or workpiece in its intended condition, and thus the machine with which this invention is used cannot be operated until the pressure switch 50 receives a positive signal from the control system to be described.

Air under pressures normally available in plant operations, for example 60 to 120 pounds per square inch, is supplied to a line 54. The air should be unlubricated and is passed through filters 56 and 58 to a pressure regulator 60 which may be set to supply air to the control system at a pressure of about 50 pounds per square inch. From the pressure regulator the air passes through a final filter 62 to a main supply line 64. The control system is shown in FIG. 2 in the condition that it occupies at the end of a complete cycle of operation of the machine and before another cycle of operation has been initiated. The detecting device at this time is in the retracted position shown in FIG. 2. The control circuit includes a line 66 which is connected into the port 28 of the detection device and a line 68 which is connected into the port 30. At the end of a cycle of operation as shown in FIG. 2, air under pressure flows from the supply line 64 to a line 70 and to lines 72 and 74 which are connected to a valve 76. The valve 76 is positioned to block the flow of air from line 72 but passes air from line 74 to a line 78 which communicates with the line 68 and supplies air under pressure to the port 30 in the detecting device to hold the piston 12 in its retracted position against the force of spring 40. Air is also supplied through line 70 to a valve 80, the position of which is controlled by a reset button 82. The line 70 is blocked at the valve 80 at this time. The air under pressure is also supplied by a line 84 to a solenoid controlled valve 86 and by a line 88 to an air controlled valve 90 but the lines 88 and 84 are blocked by their respective valves at the beginning of a cycle of operation.

When the machine completes a cycle of operation, it will energize a limit switch or other comparable device in a conventional manner to initiate another cycle of operation. Energization of the limit switch energizes the solenoid 92 which controls valve 86 and shifts the valve to a position in which line 84 communicates with a line 94, which in turn leads to a line 96 supplying an air operated valve 98 and a line 100 which supplies air to energize a valve 102 through a time delay device 104 which may be in the form of an adjustable needle valve to regulate the period of delay between energization of the solenoid valve 86 and actuation of the air operated valve 102. This time delay may be of the order of 1 second.

Valve 98 immediately passes air from line 96 to a line 106 leading to valve 102 but the air is blocked at the valve 102 until such valve is actuated through the time delay device 104. Valve 102 also passes pressurized air from line 100 to a line 108. Prior to energization of valve 102, line 108 supplies air through the reset valve 80 to a line 110 to actuate the valve 76. Thus, as soon as the solenoid 92 is energized, valve 76 will be shifted to communicate line 72 with a line 112, one branch of which supplies pressurized air to energize the valve 90 and the other branch 114 of which is connected to the line 66 which leads to the sensing port 28 in the detecting device. As soon as the valve 76 is shifted to the left in the manner described, the valve 76 will shut off flow through line 78 and line 68 which connects into the pressure port 30 of the detecting device. It should be noted here that the rod 14 does not have an airtight fit through the supporting bushing 16 and that a small amount of air is constantly bled through the bushing 16 to assist in keeping the detector free from foreign materials and also to dissipate the pressure at the port 30 when the valve 76 is actuated in the manner described. As soon as the valve 76 has shifted, the spring 40 is effective to shift the detector piston to the right as viewed in FIG. 2 to move the detecting member 22 into engagement with the tool 24 the presence or absence of which is to be detected. If a good tool is present, the piston will be stopped in the position shown in FIG. 3 in which the land 32 blocks the sensing port 28.

The pressure in the line 112 will actuate valve 90 to shift the same to the left so that air will be supplied from line 88 to a line 116 which leads to a shuttle valve 118. Air is supplied past the shuttle valve 118 to a line 120 to actuate the valve 98, shifting such valve to provide communication between line 96 and a line 122. From the shuttle valve air is also supplied through line 52 to the pressure switch 50. Thus, if a good part is present and the detector device is blocked in the FIG. 3 position, air under pressure will be supplied through line 52 to the pressure switch which is a positive signal to the machine that a good tool or part is present and the machine will then begin another cycle of operation.

Referring to FIG. 4, there is shown a position of the detecting rod beyond the position it occupies when a good tool is present such as would occur if the tool 24 is broken or absent. In this position the land 32 moves past the sensing port 28 and since the port 28 is vented to atmosphere through the bleed orifice 20 in the end plug 18, pressure will not build up in the lines 66 and 114 to an extent sufficient to actuate the valve 90. The valve 90 will then remain in the position shown so that air will not be supplied to the line 52 and the pressure switch 50. The machine will therefore fail to receive a positive signal and will not begin another cycle of operation. The failure of the valve 90 to be shifted to the left will permit the air supplied through valve 98 to line 106 to be passed into a line 124 which leads to one end of the reset valve 80 to shift the reset valve to communicate air under pressure from line 70 to a fault indicator 126 which may be in the form of an audible alarm, a visual signal, or both. Shifting of the reset valve also blocks communication through line 110 to valve 76. It should be noted here that all of the valves 76, 86, 90, 98 and 102 are biased by springs 128 to return to the positions they occupy at the completion of a cycle of operation. The reset valve 80 is not spring operated and must be manually reset following a fault before a cycle of operation can be initiated.

As soon as the valve 98 is actuated, line 122 is supplied with air under pressure which flows back through the shuttle valve 118 to the line 52 to maintain pressure in the pressure switch 50. It is also to be noted that as soon as the control system indicates a fault, the valve 76 will be shifted by its spring 128 to again provide pressure to line 78 and line 68 to the pressure port 30, thereby retracting the detector piston 12.

It will be seen that with the present invention not only is it necessary that a good tool 24 be present in order to allow the machine to be energized but it is also necessary that the detector device actually be shifted to the position shown in FIG. 3 by its spring before the machine can receive a positive signal to begin a cycle of operation. Thus, if the detector should fail to move either because of being bent or by an accumulation of chips or other foreign materials, the machine cannot be operated even if a good tool is present. The control system also guards against the malfunctioning of any of the various control elements described. For example, the pressure switch may be set to operate at about 40 pounds per square inch pressure. However, if the pressure regulator 60 does not supply air under sufficient pressure through the control system, the pressure switch will not be energized and the machine will not operate. Also, if any of the various valves fail to be operated in the required manner due to blockage or for any other reason, the control system will signal a fault and no positive signal will be received at the pressure switch. In contrast, the prior devices previously described could allow the machine to operate with a broken tool if the detection device failed to move for any reason.

FIGS. 5 and 6 illustrate a form of the detecting device that may be used for detecting the presence or absence of a hole or a keyway in a work piece or some other part feature. In this form of the invention the piston 12 is provided with an extension 130 at its forward end so that if the detection member 132 enters a hole in the part 134 to verify the presence of the hole, the sensing port 28 will be blocked by the land 32 and the system will function in the manner described. However, if the part 134 has not been drilled in a previous operation, the detector member 132 will block movement of the piston to the position shown in FIG. 6 in which the sensing port 28 is not blocked by the land 32 and therefore the pressure at the port 28 and in line 66 is vented to atmosphere through the port 34. As previously described, dissipating the pressure in the line 112 will hold valve 90 in its right hand position under the influence of its spring 128 to prevent the supply of air under pressure to the line 52 and the pressure switch 50 and signalling a fault in the manner described.

With the present invention it is not possible for any of the components of the control system to be misadjusted and still produce a positive signal at the pressure switch unless there is in fact a good tool and the detector has been operated to verify the presence of a good tool. For example, the time delay device 104 could be misadjusted by the machine operator to provide a time delay which is not of sufficient duration to allow the detector to move to its extended position to verify the presence of a good tool. If the timer is set for too short an interval, the valve 102 will be actuated before the detector has reached the tool and this will immediately connect line 124 to the source of air pressure which will shift the reset valve 80 to indicate a fault and simultaneously block flow through line 110, thereby allowing the main power valve 76 to retract. The pressure switch therefore will not receive a positive signal. If the timing device is misadjusted for too long an interval, the effect will be to hold the detector in its extended position against the tool and the build-up of pressure at the sensing port will give a positive signal to the pressure switch, allowing the machine to begin movement in another cycle of operation. However, as soon as the tool head of the machine begins to move, it will disengage the limit switch or other comparable device previously referred to, thereby deenergizing the solenoid 92. This blocks flow of air through the line 94 and also allows valve 76 to return to its normal position, thereby connecting line 78 to the pressure source and retracting the piston 12 so that the detector will not be damaged by the tool as it moves forward for another operation. Referring to the solenoid valve 86, the solenoid 92 should be energized at the start of a cycle of operation for a period slightly greater than the time delay interval set by the time delay device 104. If the solenoid does not remain energized for a period long enough to allow the detector to check the tool, the entire system will return to its normal inoperative condition and no signal will be given to the pressure switch. It will therefore be seen that as contrasted with prior devices of this type it is virtually impossible to misadjust the control system in such a way as to cause the detector to indicate the presence of a good tool or part unless the tool is present and the detector has completed its check to verify that fact.

Having thus described my invention, I claim:

1. In a detecting device for use with a machine operable through a cycle of operation upon energization of a pressure responsive switch, the improvement comprising a pneumatically operable detecting device including a movable detecting member, means biasing said detecting member to an extended position into engagement with a target such as a tool bit or workpiece the presence of which is necessary to proper operation of the machine, said detecting device including a pressure port and a sensing port, and a control system including a source of air under pressure, means operable upon energization of said control system for supplying air under pressure to said pressure port to hold said detecting member in retracted position, means operable to block the flow of air to said pressure port and simultaneously to supply air under pressure to said sensing port, means venting said sensing port except when said detector member is moved by its biasing means to a position blocking said sensing port and engaging said target, and means responsive to the build-up of pressure at said sensing port due to said blockage to supply air under pressure to said pressure responsive switch.

2. A detecting device according to claim 1, including a pressure operated fault indicator and means for supplying air under pressure to said indicator upon energization of said control system, and a time delay means for delaying operation of said indicator for a short interval following energization of said control system.

3. A detecting device according to claim 2, including means for blocking the supply of air to said indicator in response to the build-up of pressure at said sensing port.

4. A detecting device according to claim 3, wherein said time delay means is operable to allow said detecting member to move to its detecting position during said interval.

5. In a detecting device for use with a machine operable through a cycle of operation upon energization of a pressure responsive switch, a pneumatically operable detecting device including a movable detecting member, means biasing said detecting member to an extended position into engagement with a target such as a tool bit or workpiece the presence of which is necessary to proper operation of the machine, said detecting device including a sensing port and a control system including a source of air under pressure, means operable upon energization of said control system for supplying air under pressure to said sensing port, means venting said sensing port except when said detector member is moved by its biasing means to a position blocking said sensing port and engaging said target, and means responsive to the build-up of pressure at said sensing port due to said blockage to supply air under pressure to said pressure responsive switch.

6. A detecting device according to claim 5, including a fault indicator operable in response to energization of said control system and venting of said port to indicate a fault.

7. A detecting device according to claim 6, including a time delay means to delay operation of said fault indicator for a short interval following energization of said control system.

8. A detecting device according to claim 7, including a valve through which air under pressure is supplied to said pressure responsive switch, and a valve means operable to control actuation of said valve and operable to actuate said valve to supply air to said pressure responsive switch only in response to blockage of said sensing port.

* * * * *